Patented Jan. 15, 1935

1,987,672

UNITED STATES PATENT OFFICE 1,987,672

PREPARATION OF BENZYL CELLULOSE

Deane C. Ellsworth, Kenmore, N. Y., assignor to Dupont Rayon Company, New York, N. Y., a corporation of Delaware No Drawing. Application August 19, 1930, Serial No. 476,443

8 Claims. (Cl. 260—152)

This invention relates to the preparation of cellulose ethers. More particularly this invention relates to the preparation of benzyl cellulose. Still more particularly this invention relates to a method of purifying benzyl cellulose.

This invention will be described with respect to benzyl cellulose. The process is, however, applicable to the preparation of other cellulose ethers. The cellulose ethers of xylyl- and phenyl ethyl-alcohols are exemplary.

Benzyl cellulose is ordinarily produced by the action of a benzyl halide, such as benzyl chloride, on cellulose in the presence of an alkali. Any of the commonly available cellulosic materials may be benzylated, but the properties of the resulting product depend to some extent on the cellulose selected. In the reaction an excess of benzyl halide is usually used and is reacted with the cellulose in the presence of the alkali to form benzyl cellulose and alkali halide. If the alkali is sodium hydroxide and the halide is benzyl chloride the alkali halide will be sodium chloride. The sodium hydroxide (or other alkali) also reacts with the benzyl chloride to form benzyl alcohol. The reaction mass resulting from the benzylation of cellulose, consequently, comprises benzyl cellulose, perhaps some unused benzyl chloride, some benzyl alcohol, some dibenzyl ether, sodium hydroxide, sodium chloride, and water.

The benzyl alcohol plasticizes the benzyl cellulose, producing a gummy mass, which in spite of much investigation has not been purified in a manner which enables the otherwise good characteristics of benzyl cellulose to be utilized commercially.

Attempts have been made previously to purify the reaction mass by distilling with steam and/or extracting for long periods of time with methyl or ethyl alcohol. Again, the gummy mass has been ground up with solid salt before the extraction. These methods have, however, all been more or less unsatisfactory.

It is an object of this invention to prepare benzyl cellulose of high purity by a relatively simple process. Other objects will be in part apparent and in part set forth hereafter.

These objects are accomplished by dissolving or dispersing the reaction mass in a suitable fluid and thereafter precipitating the benzyl cellulose from the fluid.

In the preferred embodiment of my invention I dissolve or disperse the reaction mass in benzyl alcohol. It is not necessary that the reaction mass be completely dissolved because my invention is also operative when the benzyl cellulose is etherified only to the point where it is highly swollen but not actually dissolved by the benzyl alcohol. However, all of the ingredients which are not dissolved should be thoroughly dispersed, and enough benzyl alcohol should be added to make a reasonably fluid mass. The amount of solvent required to attain this dispersion depends on the viscosity of the solution which, in turn, depends on the degradation of the cellulose and the percentage of etherification. In the benzylation process, for instance, for each 100 parts of original cellulose converted to a soluble benzyl cellulose a reaction mass of about 750 parts will be produced, and this reaction mass, depending on its viscosity, may be dissolved in from 750 to 2000 cc. of benzyl alcohol, or more or less.

Benzyl alcohol has been discussed above as the preferred solvent but other solvents are also within the scope of my invention. For instance, pyridine, or the benzyl alcohol-dibenzyl ether mixture secured in the recovery, or the dibenzyl ether resulting from the reaction of caustic and benzyl halide and benzyl alcohol can be used.

By the terms "dispersed" and "dissolving" as used in the claims it is intended to include dispersion of the material in a condition less than dissolved (as hereinbefore described) and also dispersion in the entirely dissolved state.

One advantage inhering in the use of benzyl alcohol lies in the fact that it is a by-product of the benzylating reaction and its use, consequently, introduces no new problems of purchase or recovery.

As soon as the reaction mass is thoroughly dispersed throughout the benzyl alcohol the solution may be filtered (if desired) and the cellulose ether may be precipitated from the filtrate by treating with a non-solvent, as for instance, by pouring the solution with agitation into methyl and/or ethyl alcohol or into a solution of methyl or ethyl alcohol containing up to about 50% of water by volume. The requirement regarding water is only that the amount shall be so sufficiently small that it will not precipitate the organic solvents. If the degree of etherification of the benzyl cellulose is so low that the plastic reaction mass is not completely soluble in benzyl alcohol, the cellulose ether can be precipitated from the dispersion by the same methods which are used in precipitating from solutions.

The benzyl cellulose is precipitated as a flaky material and is filtered from the liquid. At this time care should be taken that the filter cake contain a sufficient excess of liquid to avoid coalescence of the individual particles. The precipitated material may then be treated with suitable fluids to remove the last traces of impurities. For instance, ethyl and/or methyl alcohol or their water solutions may be used to remove the last traces of benzyl alcohol and the benzyl cellulose may then be washed with water to remove sodium chloride and sodium hydroxide. After the final treatment the material is dried at less than 100° C., for instance, at 70° C.

I have discussed specifically the preparation of benzyl cellulose, and I have indicated that cellulosic materials may be used. By this I mean to include such cellulosic materials as cotton linters, purified wood pulp, undegraded or degraded cellulosic substances, and even certain cellulose derivatives such as the lower cellulose esters and ethers. By the term "a cellulose" as used in the claims I intend to include all such substances.

It will be obvious that many changes can be made within the scope of this invention. For instance, the reaction mass may be treated with water to remove sodium chloride and caustic soda, and may thereafter be kneaded to remove the water before dissolving in the benzyl alcohol. This step is, however, usually unnecessary. Again, the precipitating liquid can be added slowly with stirring to the benzyl alcohol solution.

While I have particularly described my invention with relation to the benzylation of the cellulosic material, the invention contemplates the treatment and purification of any cellulose ether where the ether is produced in the reaction mass as a body gummy because plasticized by associated substances.

The following examples illustrate the application of the invention to other ethers of cellulose than benzyl cellulose.

Phenyl ethyl cellulose

One part of cellulose is steeped in 20% caustic soda solution and pressed to approximately 2-3 parts of alkali cellulose. To this is added, while kneading or shredding, 1-4 parts of powdered caustic, and the shredding or mixing is maintained until a uniform, homogeneous, fluffy product is obtained. Six to ten parts of phenyl ethyl bromide (or a correspondingly lower amount of phenyl ethyl chloride) is added at once or at intervals, and the mixture heated at 80-100° until such time as all phenyl ethyl halide is destroyed (e. g. 20 hours). There is obtained a plastic gummy mass comprising phenyl ethyl ether of cellulose plasticized by the by-products phenyl-ethyl alcohol, and diphenyl-ethyl ether, and containing also some unreacted caustic soda, or phenyl ethyl halide, or both, and sodium chloride, and water.

This mass is dispersed or dissolved in 5-15 parts by weight of phenyl ethyl alcohol and the mixture stirred until homogeneous. The amount of phenyl ethyl alcohol to be used is such as will make a readily pourable solution of low viscosity and will depend on the original cellulose and extent of degradation and substitution occurring during the etherification.

This solution may be filtered and the filtrate may be coagulated by mixing with a precipitant (for instance ethyl, or methyl, or denatured alcohol, or solutions thereof such as aqueous solutions) in amounts such that the phenyl ethyl ether of cellulose is precipitated in a flocculent or finely divided form and the plasticizing by-products are retained in solution. The cellulose ether may then be filtered off and washed or extracted with alcohol to remove the last traces of phenyl ethyl alcohol, following which it may be washed with water to remove salt and, if necessary, with acetic or other acids to remove any excess sodium hydroxide remaining from the reaction mixture. It may be dried at temperatures less than 100° C.

Phenyl ethyl cellulose purified by this process is obtained as a fluffy or granular white powder which is soluble in chloroform, toluene-alcohol, pyridine, chlorobenzene, dioxane, and related solvents. Analysis will show it to be approximately a diphenyl-ethyl ether of cellulose.

Xylyl cellulose

The crude reaction product obtained from the reaction of cellulose with xylyl bromide (m, or p, methyl benzyl bromide) in the presence of caustic is usually obtained as a bright yellow gummy mass. The details of preparation are identical with those for preparing benzyl or phenyl ethyl cellulose.

The plastic gum contains xylyl cellulose, xylyl alcohol, di-xylyl ether, salt, water, and either sodium hydroxide, xylyl bromide, or both. It is put to disperse in meta- (ortho or para xylyl alcohols may be used above their melting points of 35° C. and 59° C. respectively) xylyl alcohol in amounts ten times the original weight of the cellulose, or more or less, until a homogeneous filterable solution or dispersion is obtained.

This may be filtered if desired.

It is then coagulated in methyl or ethyl alcohol, or in a bath of these with water or other suitable mixtures, such that the xylyl cellulose is precipitated as a flocculent or finely divided white substance, substantially free from gummy characteristics. It is then washed with alcohol to remove final traces of plasticizing agents, and with water to remove inorganic impurities, and dried.

The product is a creamy white powder, giving clear solutions in the usual solvents for benzyl cellulose.

It is possible to vary these methods of preparation and purification in the same way that the benzyl cellulose purification process may be varied; i. e., the gum may be dispersed in pyridine or dioxane; inert diluents may be used throughout the etherification; catalysts may be used. Other precipitating agents than the alcohols or alcohol water solutions may be used, for instance, ethyl ether and other ethers.

One advantage of my invention lies in the preparation of benzyl cellulose of high purity free from the substances which have heretofore made its purification and use difficult. Another advantage lies in the utilization of a by-product of the reaction in the purification of the main product of the reaction. Another advantage lies in the development of a simple process of purification of cellulose ethers. Other advantages will be apparent.

As many apparently widely different embodiments of this invention may be made without departing from the spirit and scope thereof, it is to be understood that I do not limit myself to the specific embodiments thereof except as defined in the appended claims.

I claim:

1. The method of segregating benzyl cellulose which is obtained in a condition plasticized by associated substances comprising dispersing the benzyl cellulose in benzyl alcohol and precipitating out the benzyl cellulose.

2. The method of purifying benzyl cellulose comprising dissolving the reaction mass resulting from the benzylation of cellulose in benzyl alcohol and precipitating the benzyl cellulose from the solution by the addition of an aliphatic alcohol.

3. The method of purifying benzyl cellulose comprising dissolving the reaction mass resulting from the benzylation of cellulose in benzyl alcohol, precipitating the benzyl cellulose therefrom by admixture of the solution with a non-solvent for the benzyl cellulose, and removing from the benzyl cellulose remaining traces of impurities.

4. The method of purifying benzyl cellulose comprising treating the reaction mass from the benzylation of cellulose with benzyl alcohol until the ingredients of the reaction mass are thoroughly dispersed throughout the benzyl alcohol, precipitating the benzyl cellulose by treating the dispersion with methyl alcohol and water, filtering, and washing the precipitate with methyl alcohol and with water.

5. In the method of preparing a cellulose ether, in which the cellulose ether is obtained from the etherification reaction in a gummy condition difficult to purify, the steps which comprise treating the gummy reaction product with the alcohol of the desired substituent ether group, and precipitating the cellulose ether with a non-solvent for the ether which is not a precipitant for the impurities.

6. In the method of preparing an aralkyl cellulose ether wherein the etherification reaction takes place in an alkaline medium and in which the reaction mass is obtained in a condition plasticized by an associated reaction product, the steps which comprise treating the reaction mass resulting from the aralkylation of the cellulose with the alcohol of the desired substituent ether group and precipitating the cellulose ether with a non-solvent for the ether which is not a precipitant for the impurities.

7. In the method of preparing benzyl cellulose wherein the etherification reaction takes place in an alkaline medium and in which the reaction mass is obtained in a condition plasticized by an associated reaction product, the steps which comprise treating the reaction mass resulting from the benzylation with benzyl alcohol, and precipitating the benzyl cellulose from the solution by treatment with a non-solvent for the benzyl cellulose which is not a precipitant for the impurities.

8. In the method of preparing an aralkyl ether of cellulose wherein the aralkyl ether of cellulose is obtained from the etherification reaction in a condition plasticized by an associated reaction product, the steps which comprise adding a sufficient excess of the plasticizing substance to the ether-containing mass to make a flowable mixture, and precipitating the aralkyl ether of cellulose therefrom by the addition of a substance which is a precipitant for the ether and which is not a precipitant for the plasticizing reaction products.

DEANE C. ELLSWORTH.